(12) United States Patent
Au et al.

(10) Patent No.: US 7,449,998 B1
(45) Date of Patent: Nov. 11, 2008

(54) ELECTRONIC DISPLAY PANELS FOR AUTOMOBILES

(76) Inventors: Daniel W. Au, Rm. 5, 12/fl., Goldfield Ind. Ctr.,, 1 Sui Wo Road, Fo Tan, New Territories, Hong Kong (CN); Kammy W. Au, 8468 LeRoy St., San Gabriel, CA (US) 91775

( * ) Notice: Subject to any disclaimer, the term of this patent is extended or adjusted under 35 U.S.C. 154(b) by 350 days.

(21) Appl. No.: 11/033,252

(22) Filed: Jan. 7, 2005

(51) Int. Cl.
*B60Q 1/26* (2006.01)
*H04B 1/034* (2006.01)

(52) U.S. Cl. .......................................... 340/468; 455/99
(58) Field of Classification Search ................. 340/468, 340/815.4, 691.4, 434, 691.6, 988, 425.5, 340/463–464, 990; 345/82; 455/99, 566
See application file for complete search history.

(56) References Cited

U.S. PATENT DOCUMENTS

| | | | | |
|---|---|---|---|---|
| 4,550,304 A | * | 10/1985 | Saitta | 340/472 |
| 5,754,098 A | * | 5/1998 | Holban | 340/434 |
| 5,905,434 A | * | 5/1999 | Steffan et al. | 340/464 |
| 6,060,993 A | * | 5/2000 | Cohen | 340/691.6 |
| 6,236,330 B1 | | 5/2001 | Cohen | |
| 6,812,851 B1 | * | 11/2004 | Dukach et al. | 340/815.4 |
| 2002/0112026 A1 | * | 8/2002 | Fridman et al. | 709/217 |
| 2006/0103612 A1 | * | 5/2006 | Ozaki | 345/83 |

* cited by examiner

*Primary Examiner*—Jeff Hofsass
*Assistant Examiner*—Sigmund Tang
(74) *Attorney, Agent, or Firm*—Joe Zheng

(57) ABSTRACT

Techniques for displaying messages on top of a vehicle are disclosed. Although useful in many other areas, the techniques are particularly suitable for taxicab. According to one aspect of these techniques, a display unit is mounted on top of a vehicle. The display unit includes at least two display panels facing outward respectively. The display unit is controlled by a computing device to display various messages. In one embodiment, the vehicle is provided a Global Positioning System (GPS) that determines a location of the vehicle. Coupled to the GPS, the computing device sends the location information of the vehicle to a base station and receives returned information from the base station in accordance with the location information. The returned information, at least some of which are location based, is locally processed for suitable display on the display panels.

28 Claims, 5 Drawing Sheets

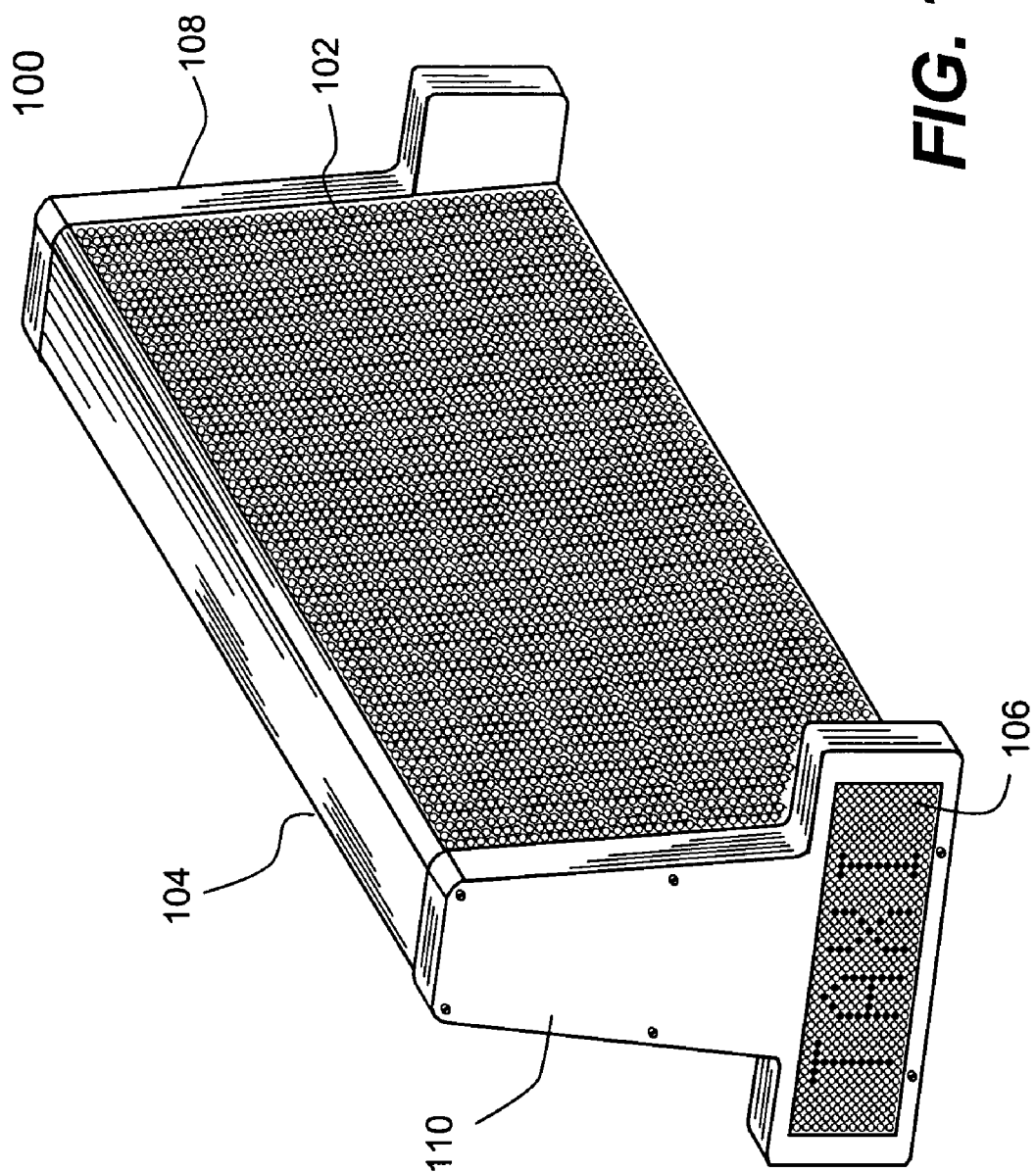

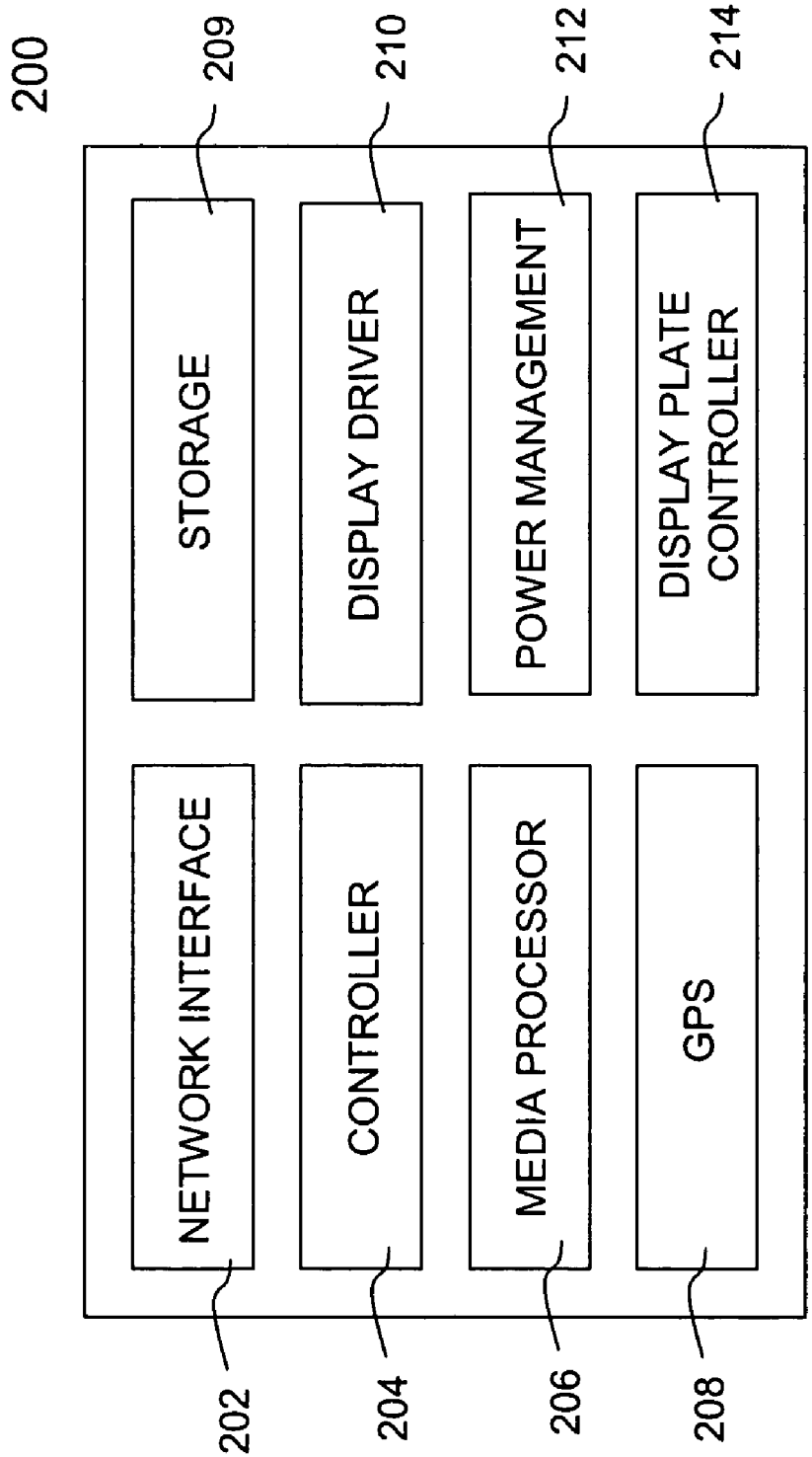

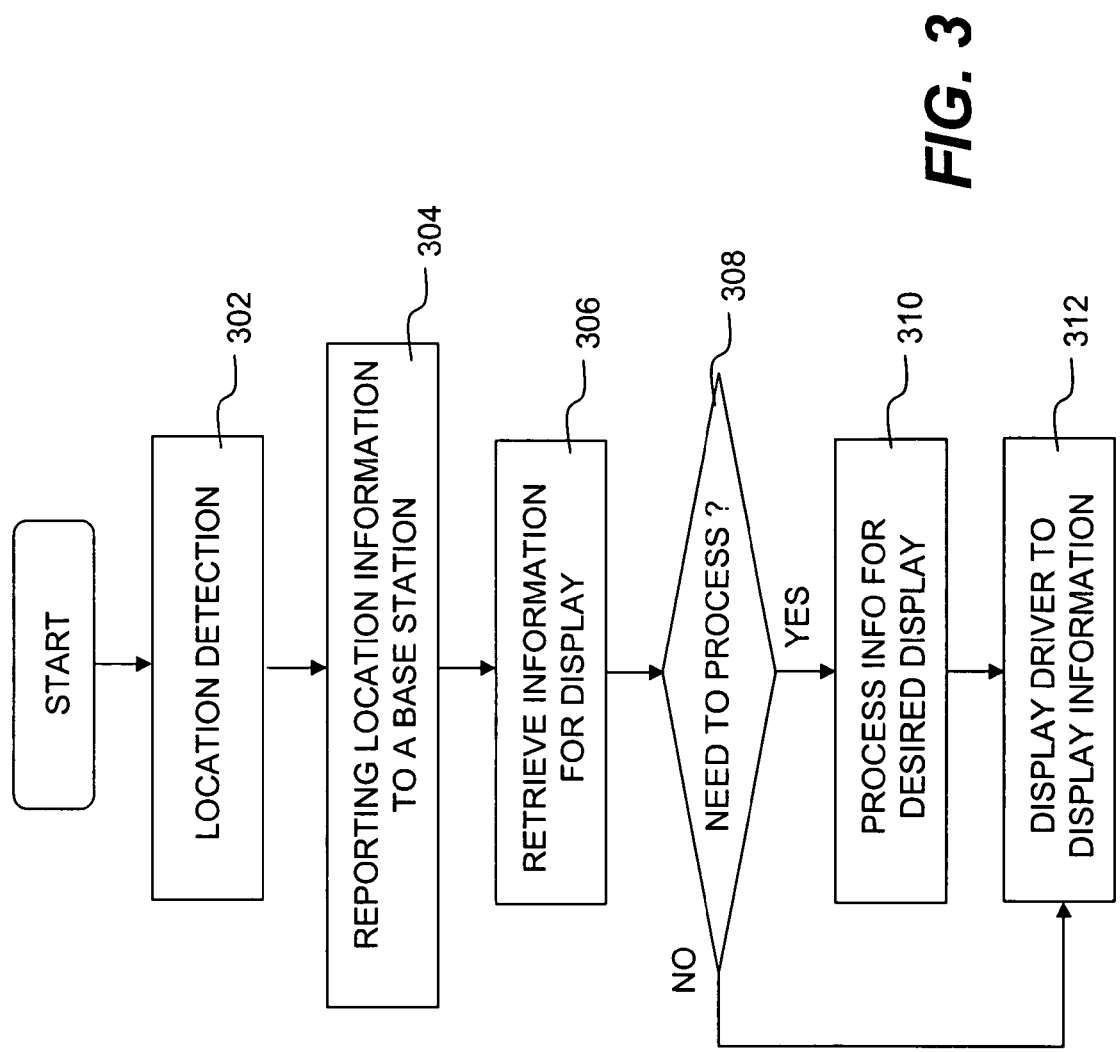

ELECTRONIC DISPLAY PANELS FOR AUTOMOBILES

BACKGROUND OF THE INVENTION

1. Field of the Invention

The present invention relates to the area of presenting information for advertising or other purposes, and more specifically to a method and system for displaying information on top of a moving vehicle, at least some of the displayed information, at the time of being displayed, pertaining to the location of the moving vehicle.

2. Description of the Related Art

Studies show that people notice words and pictures displayed on moving objects, such as trucks more than those on stationary billboards. That is why nearly all companies use their trucks to promote intended messages. For example, delivery trucks by United Parcel Service (UPS) are all in brown color and carry the company logo as well as service messages while moving trucks from U-haul are all in orange and white colors and imprinted with different sizes of available trucks and corresponding prices. The purpose of using trucks as moving billboards is to make a company stand out and get noticed in traffic areas. Similarly, advertisements or any commercial messages on moving vehicles create an eye level impact so as to increase awareness and overall positive impression for the advertiser (e.g., a company).

The moving advertisements on moving vehicles have proven to be as an effective advertising medium. Innovations in making such moving advertisements include vehicles (e.g., buses) entirely wrapped in electrostatic marking film carrying advertising messages. However, the moving advertisements on vehicles are stationary and sometimes permanent. It is generally difficult to change any messages or contents on the advertisements from time to time.

It is well known in the advertising industry that direct or relevant marketing is much more effective than the mass marketing, namely an advertisement pertaining to someone's interest or need would generate a response. For example, showing a pricy European-style furniture advertisement would make a lot of sense in a well established residential area than in a disadvantaged or crowded neighborhood.

Accordingly, there is a great need for solutions conveying information dynamically from a moving vehicle to viewers, wherein the information is conveyed based on a location of the moving vehicle and more related to viewers in the location and/or the time at which the information is seen.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The invention pertains to a display system mounted on top of a vehicle (e.g., a taxi). The display system includes a display unit configured to display messages provided locally or remotely, wherein the messages may be in form of static or moving graphics, texts, animation or video, and include a set of advertising messages and location-based messages. The display system includes a Global Positioning System (GPS) to detect the current position of the vehicle. In accordance with the location information, messages may be retrieved locally from a storage device or remotely from a base station via a wireless network. As a result, relevant messages or commercial advertisements can be displayed in the display unit.

The display unit includes at least two display panels and two display plates. The display panels are for displaying received or retrieved messages. In one embodiment, two display panels are mounted oppositely with the display side facing outwards such that the display panels may be readily seen when the vehicle goes around. In another embodiment, three display panels are positioned along the three sides of a triangle. When mounted on top of a vehicle, with one of three display panels facing the rear of the vehicle, all three display panels may be conveniently viewed by viewers in nearly all directions of the vehicle. Depending on implementation, the display panel in use may be of liquid crystal display (LCD) or light emitting diode (LED). The display plates are for displaying emergency messages when needed. In general, the display plates are smaller in size compared to that of the display panels. The display plates that normally display a default message may be triggered to display an emergency message. For cost consideration, the display plates are normally made based on LED.

One of the objects, features, advantages, benefits of the present invention is to provide a solution for conveying media information to viewers, the solution employs a vehicle mounted with a display system. When the vehicle goes around in traffic areas, relevant information displayed in the display system may be readily seen by viewers.

Other objects, features, advantages, benefits of the invention will become more apparent from the following detailed description of a preferred embodiment, which proceeds with reference to the accompanying drawings.

BRIEF DESCRIPTION OF THE DRAWINGS

The present invention will be readily understood by the following detailed description in conjunction with the accompanying drawings, wherein like reference numerals designate like structural elements, and in which:

FIG. 1 shows a display system suitable for being mounted on top of a moving vehicle such as a taxi, the display system includes two display panels and two display plates;

FIG. 2A shows a functional block diagram of a control system in the display system;

FIG. 3 shows a flowchart or process of displaying media information to viewers via a display system mounted on top of a vehicle.

DETAILED DESCRIPTION OF THE INVENTION

Figure 2B:
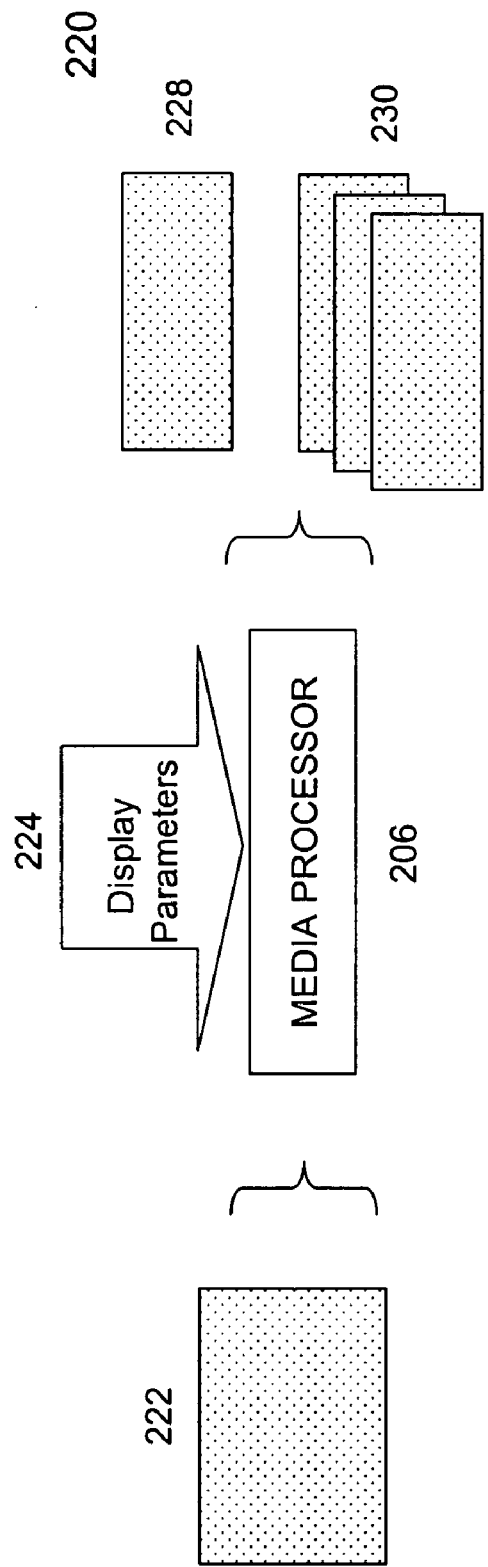
FIG. 2B shows an example of processing a media content in a media processor.

The invention pertains to a display system mounted on top of a vehicle (e.g., a taxi). The display system includes a display unit configured to display messages provided locally or remotely, wherein the messages may be in form of static or moving graphics, texts, animation or video and include a set of advertising messages and location-based messages. The display system includes a Global Positioning System (GPS) to detect the current position of the vehicle. In accordance with the location information, messages may be retrieved locally from a storage device or remotely from a base station via a wireless network. As a result, relevant messages or commercial advertisements can be displayed in the display unit.

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Referring now to the drawings, in which like numerals refer to like parts throughout the several views. FIG. 1 shows a display system 100 suitable for being mounted on top of a moving vehicle such as a taxi. The display system 100 includes two display panels 102 and 104 (not explicitly shown in the figure), and two display plates 106 and 108 (not explicitly shown in the figure). Preferably, the display panels 102 and 104 are identical. According to one embodiment, the display panel 102 or 104 is a liquid crystal display (LCD) panel. According to another embodiment, the display panel 102 or 104 includes a matrix of light emitting diodes (LED). The light emitting diodes in the matrix may be in at least three different colors (e.g., red, green and blue), surface mount diodes or tri-color diodes. To support weather proof, in one embodiment, each of the diodes is positioned and sealed on a silicon base and/or UV protected. Additionally, the display panels and/or display plates may be protected by a tinted or clear polycarbonate screen for protection from harmful UV rays and damages from vandalism or accident.

The two display panels 102 and 104 are provided to display media information that may include, but may not be limited to, images, graphics, animations, video and texts. The media information may be provided locally or remotely. As will be further described below, locally provided media information is typically from a storage device integrated or enclosed in the display system 100 while remotely provided multimedia information is provided wirelessly from a base station.

The two display plates 106 and 108 are configured to display fixed messages such as "Taxi" or "Help". In a normal condition, a word "Taxi" or the like may be displayed. In an emergency situation in which, for example, a driver needs help, a switch in the vehicle may be activated to cause an eye-catching message (e.g., "Help") to be displayed. In one embodiment, each of the two display plates 106 and 108 includes an array a matrix of light emitting diodes in at least one color. In a normal condition, the two display plates 106 and 108 are coupled to a fare meter and, when a taxi operates, are turned on to display a word or phrase in one color (e.g., green or yellow) to indicate that the taxi is for hire. In an emergency situation, a word or phrase is shown, perhaps in another color (e.g., red or amber), and/or flashed panically or periodically. As will be described below, the word or phrase in the emergency situation may be supplied by a base station via a network for amber alerting applications.

In one embodiment, spaces such as those above the display plates, referenced by 110 as an example, may be used for displaying static messages. Thus the display system 100 essentially provides means to display both media information that may be dynamic or static as well as to display pure static information in the traditional billboard style.

Referring to FIG. 2A, there shows a functional block diagram 200 of a control system or computing device in the display system 100 of FIG. 1. According to one embodiment, the control system includes a network interface 202, a controller 204, a media processor 206, a global positioning system (GPS) 208, a storage device 209, a display driver 210, a power management device 212, and a display plate controller 214. It should be noted that not all of these components must be employed in order to practice the present invention.

The network interface 202 facilitates data exchange between the system 100 and a base station. In one embodiment, the network interface 202 operates to facilitate the system 100 of FIG. 1 to exchange data over a wireless network. In one example, the network interface 202 operates in accordance with a commonly used protocol such as UDP, TCP/IP or a cellular protocol. The controller 204 controls operations of these and other components and causes the display driver 210 to output desired information in desired manners.

The media processor 206 may be part of the controller 204 and is configured to perform processing of media information. One of the features in the present invention is that the display system 100 of FIG. 1 displays all types of information including static or moving graphics, texts, animations as well as motion images. Because the physical sizes of the display panels such as those panels 102 and 104 in FIG. 1 can be in sizes different from the original sizes of the content intended to be displayed, if displayed without preprocessing, cropping or other undesired effects may be seen. In some case, a retrieved movie or message is in compressed format, the media processor 206 is configured to decompress the movie or message. The media processor 206 is provided to ensure that contents to be displayed are processed accordingly so as to display the information correctly on the display panels.

FIG. 2B shows that an original content 222 is in a first size and the processed content 228 is in a second size. The original content 222 may be provided locally or remotely. The media processor 206 is configured to process the original content 222 in accordance with display parameters 224 pertaining to the display panels or other desired artistic effects. The display parameters 224 include at least information about width and height of the display panels. Subsequently, processed content is produced in a format 228 or 230. According to one embodiment, the format 228 is simply a standard display. Like a television or computer display monitor, the standard display means herein to display the original content in fidelity. Conversely, the format 230 is a format that includes some artistic effects in the original content. For example, the height of the original content is bigger than that of the display panel, the processed content in format 230 is now in several frames that can be shown sequentially or in a rolling manner. Another example of the format 230 may include special artistic effects in the processed content, where these special artistic effects may be very suitable for a type of display panel. In an amber application, a special message is received. The message can be processed to be displayed on a display panel in a manner that readily draws attention from viewers (e.g., pedestrians).

The GPS 208 is a device that, when operating in conjunction with the vehicle, detects the present location of the display system. When the display system is mounted on top of a taxi, the GPS 208 indicates the present location of the taxi.

According to one embodiment, the GPS 208 outputs the location information that enables the display system 100 to display location-based information. An example of the location-based information is a special offering in a local department store. Together with a current time provided inherently in the display system 100, the location-based information can be also time-sensitive. An example of the location-based information that is also time sensitive is an advertisement of a special offer valid from 11:00 AM to 2:00 PM from a local restaurant or a fast food chain store.

Figure 2C:
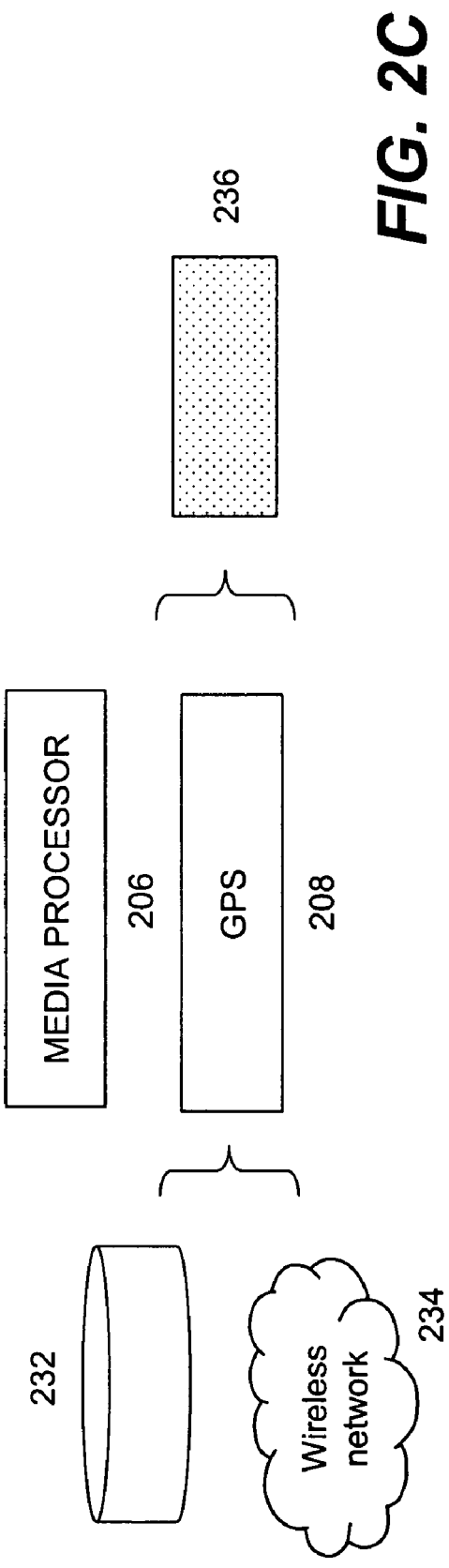
FIG. 2C shows that information to be displayed may be retrieved locally or remotely.

FIG. 2C shows that the location-based information that may be also time sensitive may be from a local storage device 232 or provided from a base station via a wireless network. In one embodiment, the storage device 232 in the display system 100 is loaded with a plurality of commercial advertisements, some of which are specifically requested to be displayed in a certain location during a certain time. When a taxi happens in the specified location detected by the GPS 208 and when the certain time arrives, such commercial advertisements are retrieved and may be processed by the media processor 206 for display on the display panels. When a taxi mounted with such display system is in a location other than the specified location, commercial advertisements pertaining to the location may be provided from a base station via the wireless network 234. Regardless of the original source of the commercial advertisements, the GPS 208 and the media processor 206 (perhaps with other components) facilitate polling of relevant commercial advertisements and to display the advertisements properly on the display panels.

The storage device 208 is provided to store code or software modules for various applications in addition to providing a storage space for media information. One of the modules is to facilitate the operations of many of the components in the control unit 200 of FIG. 2. Another one of the modules is to record time, duration or location when a particular piece of media information has been displayed. Still another one of the modules is a schedule that determines how, when and where a particular piece of media information needs to be displayed. In one application, the storage device 208 is scheduled to download media information from a base station along with a schedule. In another application, the storage device 208 is scheduled to receive certain media information from a base station when the vehicle is in a coverage area of the base station.

According to one embodiment, one of the modules is configured to perform conversations of media information received for display. When a received media advertisement is in MPEG2 that is good for LCD display panels but nevertheless not suitable for display on LED display panels, the module converts the media advertisement in MPEG2 to MPEG4 or other format suitable for display on the LED display panels.

The display driver 210 or the display plate controller 214 is a device that facilitates a proper display of any content on a corresponding display panel or plate. To distinguish the two types of functions of displays, the display 102 or 104 is referred to as a display panel while the display 106 or 108 is referred to as a display plate. Those skilled in the art would understand that it is not a limitation in the present invention that the two displays must be different. Both the displays 102 or 104 may be of the same type. In practice, according to one embodiment, the displays 106 and 108 are used for emergency messaging when needed, while the displays 102 and 104 are primarily used for conveying static or dynamic messaging to potential viewers (e.g., pedestrians).

The display system 100 operates on a power unit (e.g. battery) of the vehicle and may draw significant power from the power unit. The power management 212 is provided to ensure that the vehicle is not disabled from the low power of the power unit because of the display system 100. In one embodiment, the power management 212 is configured to regulate the use of the power by the display system 100 to ensure that the display system 100 operates with a least amount of power. In another embodiment, the power management 212 is configured to automatically turn off the display system 100 in an event that the vehicle stops for an undesired lengthy period.

Figure 2D:
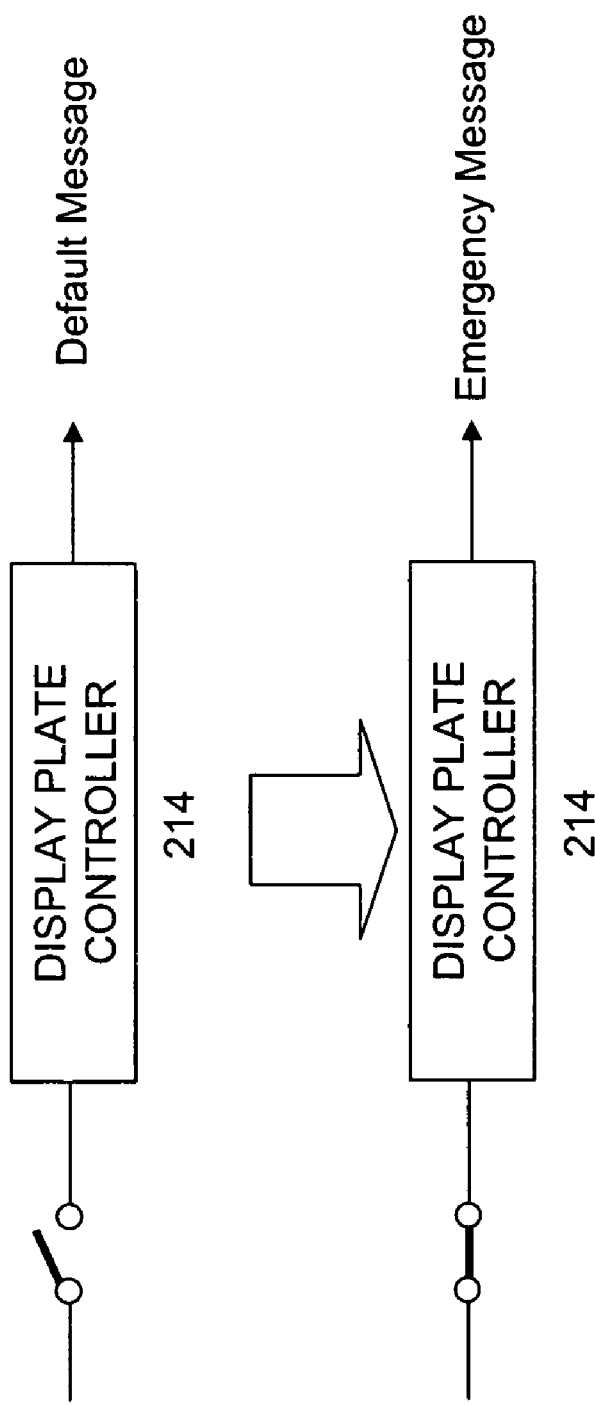
FIG. 2D shows a control of a display plate being turned a default message to an emergency message.

Referring now to FIG. 2D, there shows a control of the display plate 106 or 108. The display plate 106 and 108 in a normal condition emulated with a switch 250 in "off" position show a default message. When a driver needs immediate help from others, the switch 250 is in "on" position, causing the display plate controller 214 to display an emergency message on the display plates. Preferably the emergency message is displayed in a manner that readily draws attention from others. According to one embodiment, the switch 250 may be located conveniently near the driver. When, for example, the driver is being attached or in need for help, the driver may activate the switch that causes the display plates to show an emergency message to draw attentions from viewers. In any case, it should be understood to those skilled in the art that either the default message or the emergency message may be dynamically changed to a situation or electronically determined by the control unit 200 of FIG. 2.

Referring now to FIG. 3, there shows a flowchart or process 300 of displaying media information to viewers via a display system mounted on top of a vehicle. The process 300 may be understood in conjunction with the previous figures and implemented as a method and a system to efficiently convey relevant information to viewers. At least some of the relevant information may be location-based and others may be time sensitive. The relevant information may come in a form of graphics, texts, animation or video.

As described above, a display system, such as that 100 of FIG. 1, is preferably mounted on top of a car (e.g., a taxi). Accordingly, at 302, the current location of the car is determined via a GPS. At 304, the location information is transported to a base station via a wireless network (e.g., a cellular network). The base station may be operated by a service provider and provide various information to registered cars to display some of the information at relevant location at a predefined time. In one embodiment, the location information including longitude and altitude of the vehicle is transported to the base station in data format suitable for a commonly used communication protocol (e.g., UDP or TCP/IP).

At 306, the display system receives media information either locally or remotely. As described above, some of the media information may be pre-stored or loaded at a certain time in a storage device integrated or enclosed in the display system and others can be lively fed or retrieved from a base station. In one embodiment, a request including the location and time information is generated, the request is sent to the storage device to determine whether any preloaded information shall be displayed. If there is one commercial message that needs to be displayed, the message is retrieved from the storage device. The request may also be sent to the base station that determines any relevant information with criteria met by the parameters in the request. If there is one message that shall be displayed on the display system of the vehicle in the particular location at the specified time, the message is then transported in response to the request to the display system.

Regardless where the message or media information is retrieved, at 308, a decision is determined whether the retrieved media information needs to be processed. If there is no need to process the retrieved information, the process 300 goes to 312 that causes the display panels to display the retrieved information. If the retrieved information needs to be processed, the process 300 goes to 310, where the retrieved information is processed in accordance with predefined requirements (e.g., resizing and rendering to add artistic effects). The processed information is then sent to the display panels for display at 312.

Other functions, not shown in FIG. 3, may include recording time, duration and location of a particular message that has been displayed. Such information may facilitate a service provider to determine billing information for its clients.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

We claim:

1. A display unit system for displaying messages, the display unit system comprising:
    display panels configured to display messages provided by a computing device, wherein the messages include a set of advertising messages including location-based messages, and the display panels are mounted on top of a vehicle and face oppositely from each other so that the messages can be readily seen when the vehicle goes around;
    a power management unit configured to automatically stop the vehicle energizing the display unit in an event that the vehicle stops for a predefined period;
    a Global Positioning System (GPS) determining a location of the vehicle,
    wherein the computing device, coupled to the GPS, communicates wirelessly with a base station to receive at least some of the messages in accordance with the location of the vehicle; and
    two display plates facing oppositely from each other and integrated orthogonally with the display panels for displaying a default message in a normal condition and activated to display a predetermined message where the default message was displayed when the driver deems it necessary to draw attention from others.

2. The system as recited in claim 1, further including a storage device in the vehicle, some of the advertising messages and location-based messages are locally stored in the storage device and are displayed according to a time or a location of the vehicle.

3. The system as recited in claim 1, wherein each of the two display plates includes an array light emitting diodes and is coupled to a fare meter of the vehicle, when the vehicle operates, both of the display plates are turned on to display the default message in one color to indicate that the vehicle is for hire.

4. The system as recited in claim 3, wherein the default message is "TAXI" composed by LEDs in the display plates and the predetermined message is "HELP" and displayed in another color to indicate that the vehicle or the driver thereof needs help.

5. The system as recited in claim 3, further comprising a switch that is conveniently located in the vehicle and reachable by a driver of the vehicle, and wherein the display unit further includes at least one display plate that is controlled by the switch.

6. The system as recited in claim 1, wherein each of the display panels includes a plurality of groups of LEDs, each group including a red LED, a green LED and a blue LED, and the array of LEDs is controlled by the computing device and powered by the vehicle.

7. The system as recited in claim 6, wherein, when the predetermined message is displayed, the predetermined message is flashed in a manner that easily catches attentions from others.

8. The system as recited in claim 5, wherein there is a space above each of the display plates, the space is reserved for displaying a static message above the default message or the predetermined message.

9. The system as recited in claim 8, wherein the static message is easily visible when a pedestrian needs the vehicle and the vehicle shows the default message.

10. The system as recited in claim 1, wherein some of the messages are locally processed in the computing device to add desired artistic effects to the messages to draw attention from pedestrians.

11. The system as recited in claim 10, wherein some of the messages are in a compressed format and locally processed to display both static or non-static information on the display panels.

12. The system as recited in claim 1, wherein the computing device sends location information of the vehicle to the base station that returns at least some of the messages in accordance with the location information such that the messages displayed are relevant to those who see the displayed messages in the location of the vehicle.

13. The system as recited in claim 1, further including a circuit driving the display unit, the circuit designed to control power consumption by the display unit and configured to ensure that the vehicle is not disabled because of the power consumption of the display unit.

14. The system as recited in claim 13, wherein the circuit causes the display unit to be brighter when in day time and less bright when in night time.

15. The system as recited in claim 1, wherein the display unit includes at least two display panels, each of the two display plates positioned closely with one of the two display panels, and wherein the two display panels are for displaying media information and the two display plates are for displaying a default message in a normal condition and overriding the default message with an emergency message in an emergency condition.

16. The system as recited in claim 15, wherein each of the display panels is one of an LCD panel or an LED panel.

17. The system as recited in claim 16, wherein the LED panel includes a matrix of light emitting diodes in three different colors or tri-color light emitting diodes.

18. The system as recited in claim 15, wherein each of the display panels and two display plates is protected by a waterproof means.

19. The system as recited in claim 15, wherein each of the display panels and two display plates is protected by a tinted or clear polycarbonate screen for protection from harmful UV rays or damages from vandalism or accident.

20. A method for displaying messages, the system comprising:

provide a vehicle;

providing a Global Positioning System (GPS) in the vehicle;

mounting a display unit on top of the vehicle, the display unit having display panels facing oppositely from each other configured to display messages provided by a controller that communicates wirelessly with a base station, the controller configured to display in the display unit the messages, wherein the messages include a set of advertising messages and location-based messages, at least some of the messages are provided from a storage device controlled by the controller, and wherein the controller causes the display unit to be brighter when in day time and less bright when in night time;

energizing the display unit from the vehicle, wherein the Global Positioning System (GPS) determines a location of the vehicle, and the controller, coupled to the GPS, communicates wirelessly with a base station to receive at least some of the messages in accordance with the location of the vehicle, said energizing the display unit from the vehicle suspends whenever the vehicle stops for a predefined period; and providing two display plates facing oppositely from each other and integrated with the display unit for displaying a default message in a normal condition and activated to display a predetermined message where the default message was displayed when the driver deems it necessary to draw attention from others, wherein the display plates are attached orthogonally to the display panels in the display unit.

21. The method as recited in claim 20, wherein the display unit includes at least two display panels, each of the display panels is an LCD panel or an LED panel.

22. The method as recited in claim 21, wherein the LED panel includes a matrix of light emitting diodes in three different colors or tri-color light emitting diodes.

23. The method as recited in claim 20, wherein there is a space in above each of the display plates, the space is reserved for displaying a static message above the default message or the predetermined message.

24. The method as recited in claim 23, wherein the display plates are only turned on when the driver deems it necessary to draw attentions from others.

25. The method as recited in claim 24, wherein the static message is easily visible when a pedestrian needs the vehicle and the vehicle shows the default message.

26. The method as recited in claim 20, further comprising:

sending to the base station location information of the vehicle;

receiving returned information from the base information in response to the location information; and processing the returned information in accordance with specification of the two display panels.

27. The method as recited in claim 26, wherein the processing of the returned information comprising:

resealing the returned information to fit a size of the display panels.

28. The method as recited in claim 27, wherein some of the returned information are in a compressed format, and wherein the processing of the returned information comprising:

processing the some of the returned information to display non-static information on the display panels.

* * * * *